Jan. 16, 1962    M. L. PERSINGER ET AL    3,016,817
INDOOR BARBECUE WITH SLANTING GRILL
Filed Nov. 2, 1956    5 Sheets-Sheet 2

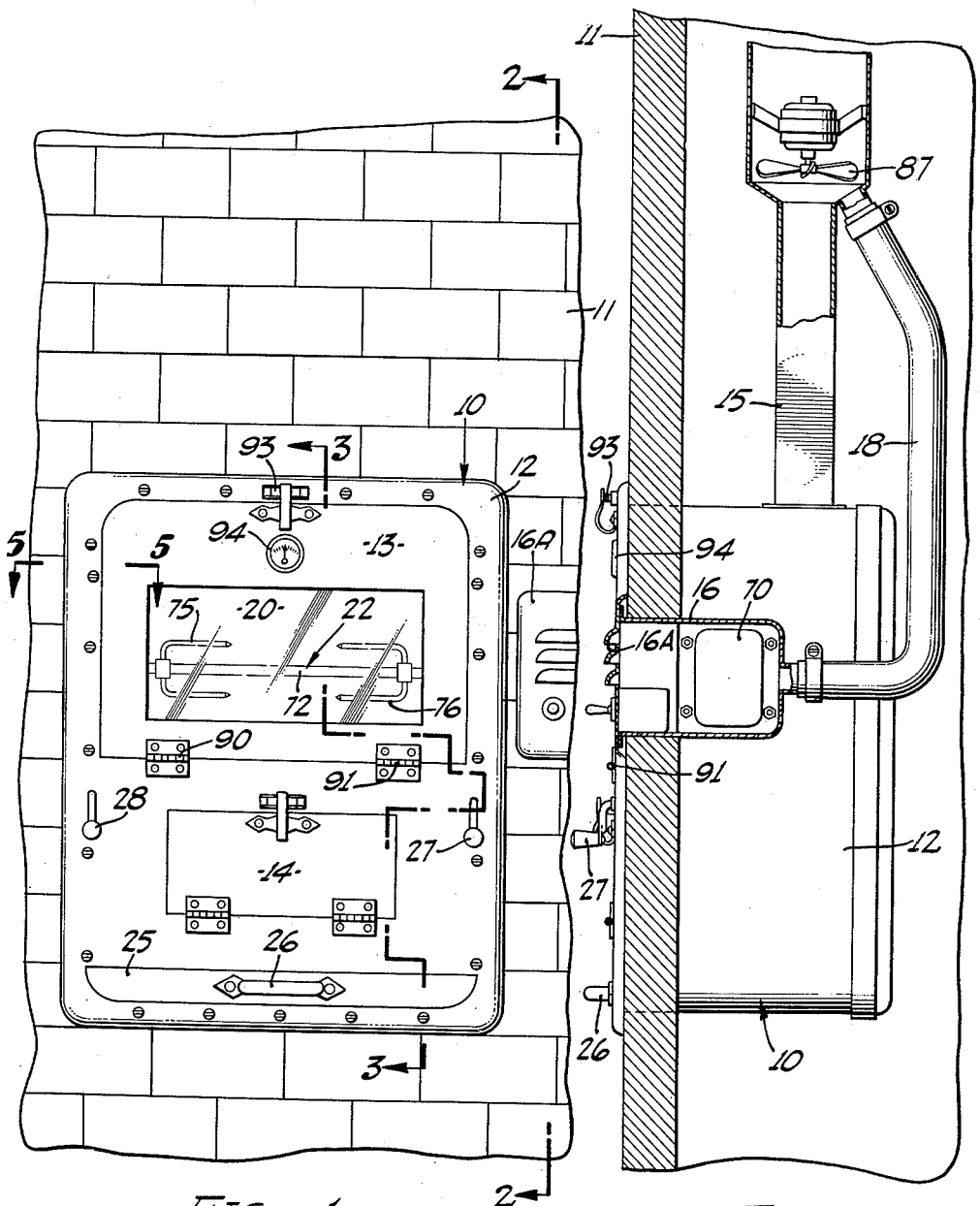

INVENTORS
MERLE L. PERSINGER
LAVERNE O. PERSINGER
BY
Lyon & Lyon
ATTORNEYS

Jan. 16, 1962    M. L. PERSINGER ET AL    3,016,817
INDOOR BARBECUE WITH SLANTING GRILL
Filed Nov. 2, 1956    5 Sheets-Sheet 3

INVENTORS
MERLE L. PERSINGER
LAVERNE O. PERSINGER
BY
*Lyon & Lyon*
ATTORNEYS

Jan. 16, 1962 M. L. PERSINGER ET AL 3,016,817
INDOOR BARBECUE WITH SLANTING GRILL
Filed Nov. 2, 1956 5 Sheets-Sheet 4

INVENTORS
MERLE L. PERSINGER
LAVERNE O. PERSINGER
BY
Lyon & Lyon
ATTORNEYS

Jan. 16, 1962 M. L. PERSINGER ET AL 3,016,817
INDOOR BARBECUE WITH SLANTING GRILL
Filed Nov. 2, 1956 5 Sheets-Sheet 5

INVENTORS
MERLE L. PERSINGER
LAVERNE O. PERSINGER
BY
Lyon & Lyon
ATTORNEYS

United States Patent Office 3,016,817
Patented Jan. 16, 1962

3,016,817
INDOOR BARBECUE WITH SLANTING GRILL
Merle L. Persinger and Laverne O. Persinger, Burbank, Calif., assignors to Seidelhuber Steel Rolling Mill Corporation, a corporation of Washington
Filed Nov. 2, 1956, Ser. No. 620,097
4 Claims. (Cl. 99—339)

The present invention relates to barbecue equipment and more specifically to barbecue equipment conveniently arranged for mounting in a wall of a building, such as for example, in the wall of a kitchen of a residence so that the user may barbecue foods within his residence without having to go outdoors.

An object of the present invention is to provide barbecue equipment for indoor use.

Another object of the present invention is to provide barbecue equipment having a manually adjustable grill which may be adjusted to different tilted positions.

Another object of the present invention is to provide improved barbecue equipment which incorporates an adjustable slanting grill, down which greases flow and drip therefrom into a grease receptacle without going into the fire box.

Another object of the present invention is to provide barbecue equipment of this character in which the grease is directed away from the fire box so as to minimize the possibility of the grease dripping into the fire box and being burned therein to produce objectionable smoke and odors.

Another object of the present invention is to provide barbecue equipment in which the grill and the fire box are independently adjustable, one with respect to the other.

Another object of the present invention is to provide barbecue equipment including a motor driven spit in which the motor is cooled in a novel manner.

Another object of the present invention is to provide barbecue equipment having a cradle which is adjustable and which is adapted to mount different sized fire boxes.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a front view of barbecue equipment mounted in a recess in a wall in accordance with features of the present invention.

FIGURES 2 and 3 are sectional views taken respectively on the lines 2—2 and 3—3 in FIGURE 1.

Figure 3:
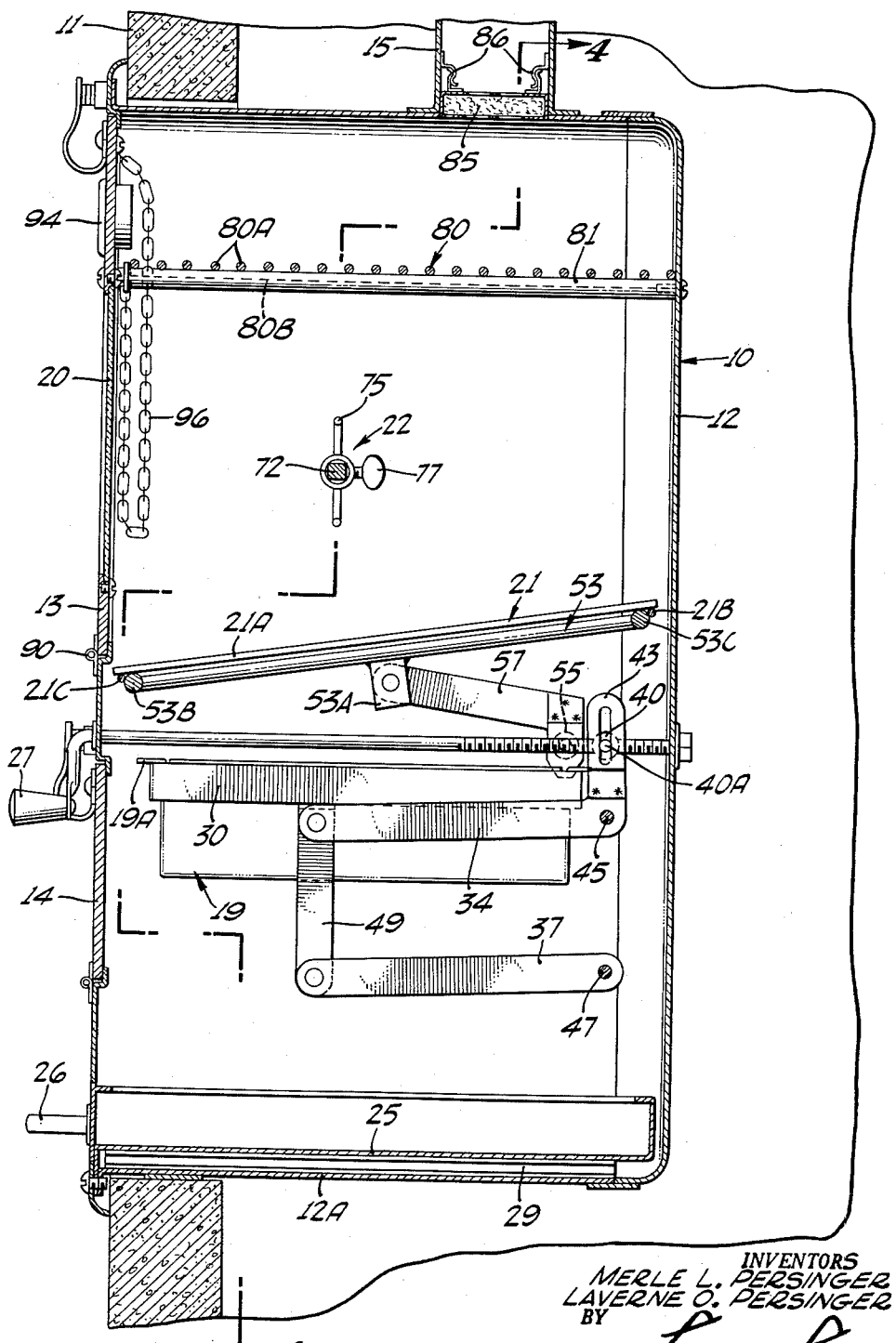

As shown in the drawings, the barbecue unit 10 is mounted in a recess in the wall of a building structure 11. The unit 10 is in the form of a generally rectangular metal casing 12 which is provided with two access doors 13, 14 in the front face thereof and an upwardly extending flue 15 together with a motor housing 16 having a vent conduit 18 in communication with the flue 15.

The door 14 allows access to the fire box; and the door 13 which is provided with a transparent window 20 allows access to both the upper side of the grill 21 as well as the motor driven spit 22.

Figure 4:
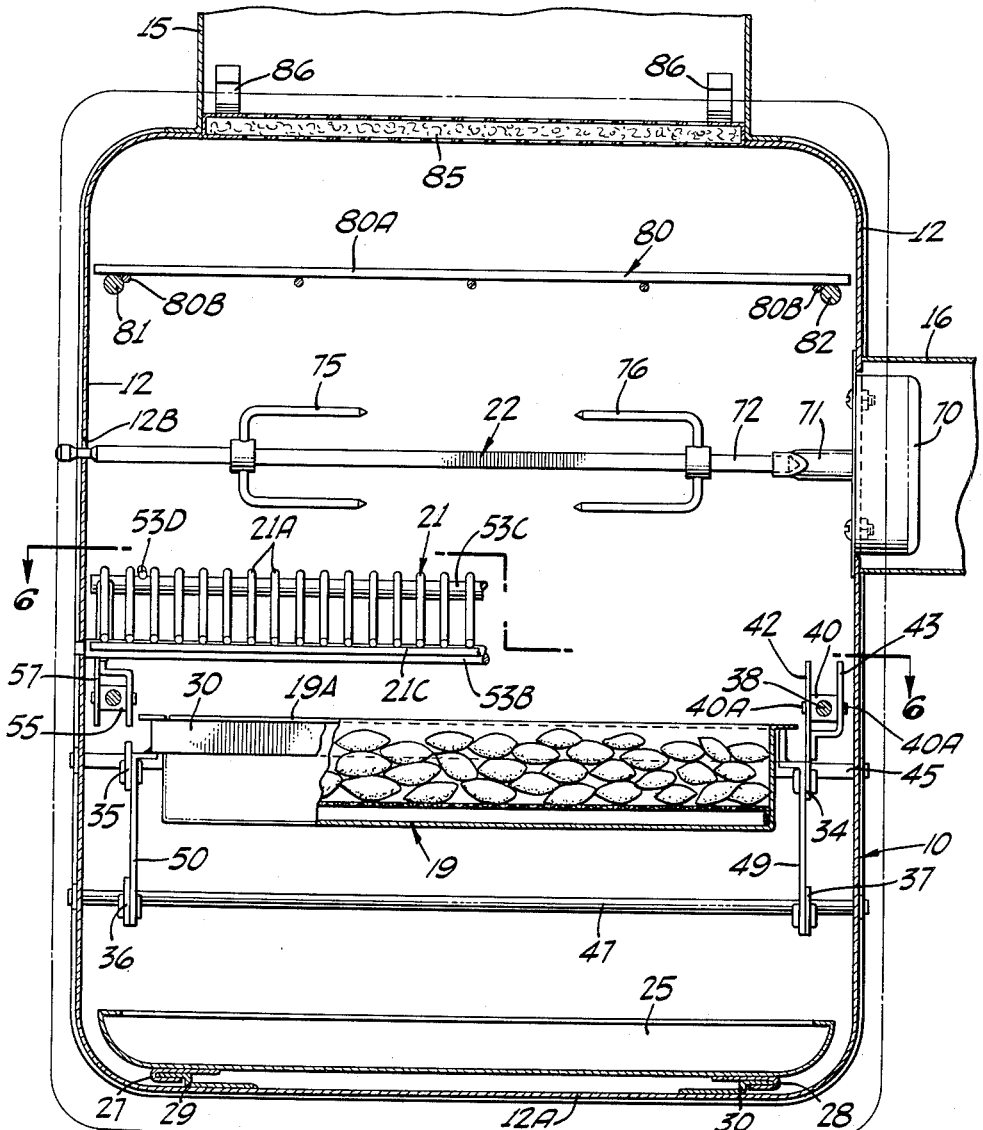
FIGURE 4 is a sectional view taken on the line 4—4 of FIGURE 3.

A removable drip pan 25 having a handle 26 is slidably mounted in the casing 12 to receive drippings. For this purpose the drip pan 25 as shown in FIG. 4, has secured thereto a pair of U-shaped supports 27, 28 partially embracing corresponding runners 29, 30 secured on the bottom wall or floor 12A of the casing 12. This drip pan 25, as shown in FIG. 3, extends substantially the full depth of casing 12.

The fire box 19 may be adjusted to different heights by turning the crank 27; and a crank 28 may be turned to move the grill 21 to a horizontal position or to different degrees of slant.

Figure 10:
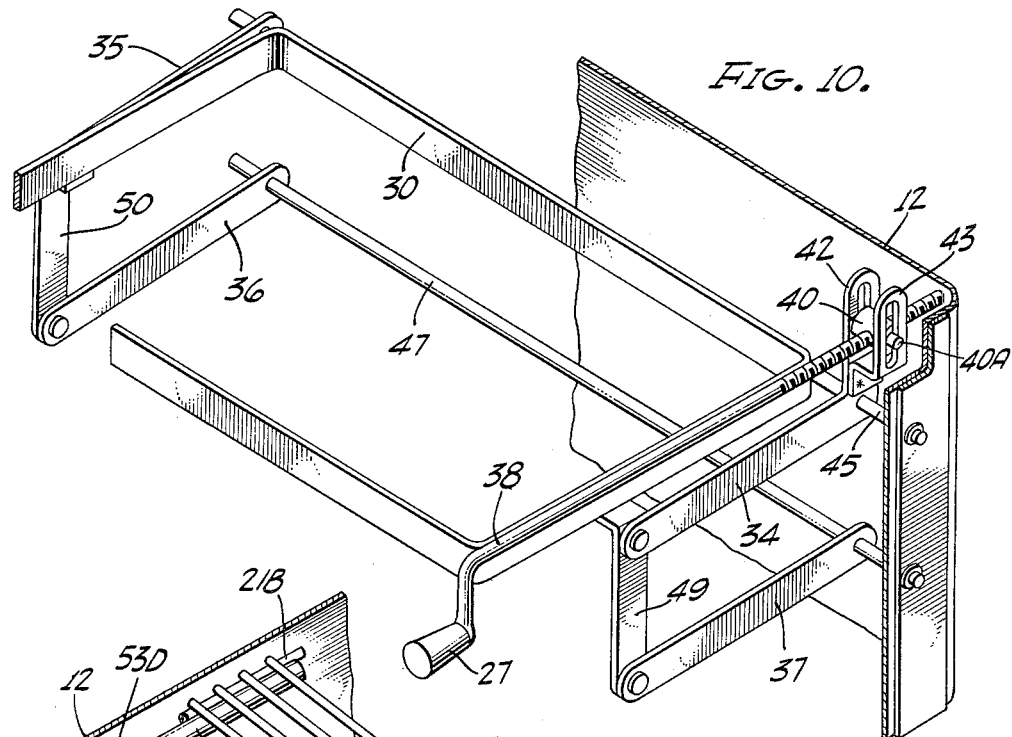
FIGURES 10 and 11 are perspective views illustrating details of the firebox and grill-adjusting mechanisms respectively.

The fire box 19 is supported by its upper outwardly extending flanged portion 19A on a rectangular cradle 30 which is adjustable to different heights using a parallelogram type of adjusted supporting structure (FIG. 10) involving arms 34, 35, 36, 37 and the threaded rod 38, the rod 38 being an extension of crank 27. The rod 38 as shown in FIG. 3 is journalled for rotation in the front and back walls of casing 12 and has a special form of nut threaded thereon. The nut 40 moves along the axis of the rod 38 when and as it is turned and has a pair of projections 40A extending into cooperating slotted portions in slotted arms 42, 43 which extend upwardly from arm 34. It is noted that the arm 34 and arms 42, 43 secured thereto form an L-shaped lever and such lever is pivoted on the rod 45, the rod 45 being secured in opposite side walls of casing 12 and having also the arm 35 pivoted thereon. The arms 36 and 37 are pivoted in like manner on a rod 47 which likewise has its opposite ends affixed to opposite side walls of casing 12 and which extends parallel to rod 45. The forwardly disposed ends of levers 34 and 37 are pivoted to an interconnecting link 49 having its upper end bent inwardly and secured, as for example, by welding, to the cradle 30. Likewise, the forwardly disposed ends of levers 35 and 36 are pivoted to an interconnecting link 50 which has its upper end bent inwardly and welded to the opposite side of cradle 30. Using this structure the fire box 19 may be raised and lowered to different adjusted positions with the plane of the fire box always remaining horizontal.

Figure 11:
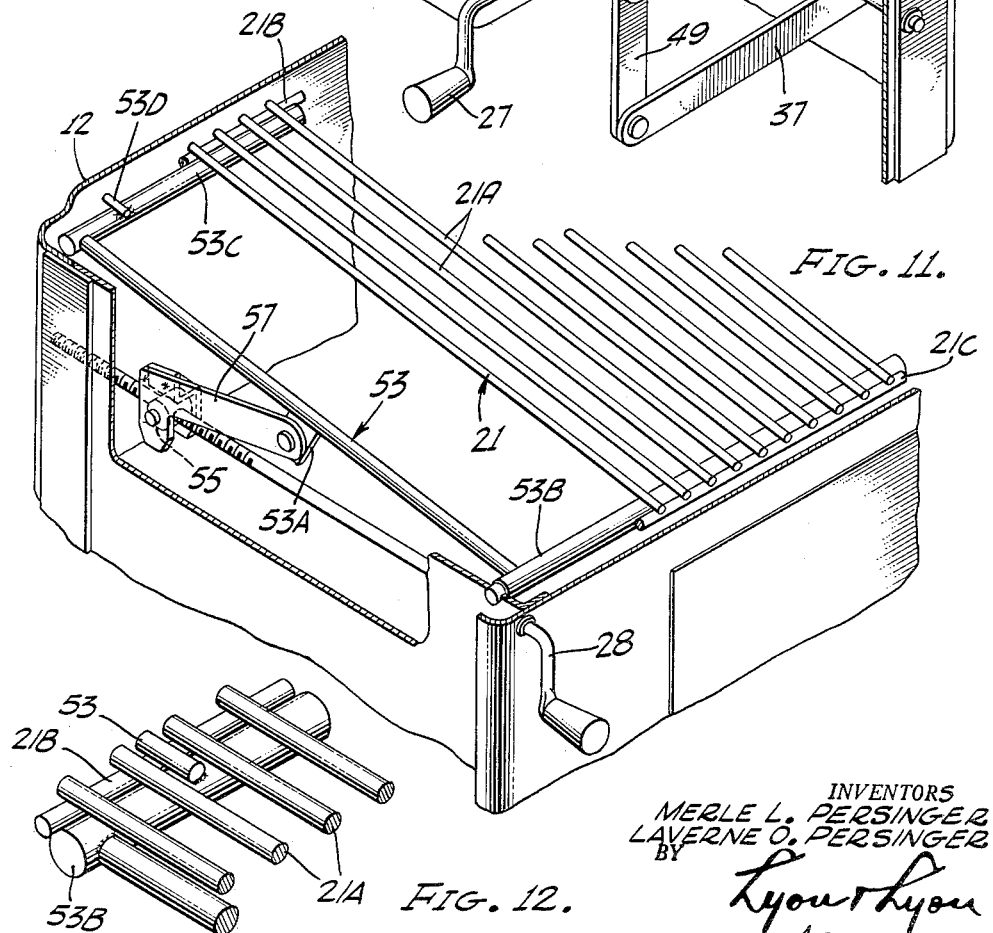
Figure 12:
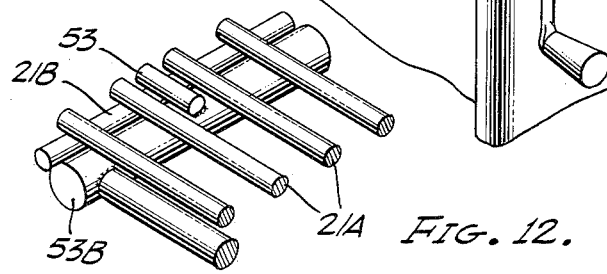
FIGURE 12 is a perspective view illustrating further details of the grill construction.

The adjusting mechanism for the grill 21, as shown in FIG. 11, involves a cradle 53 which is pivoted upon rotation of lever 28. The lever 28 is journalled for rotation in the front and rear walls of casing 12, is threaded, and carries a special form of nut 55 which is moved axially when and as the crank is rotated. The nut has secured thereto the lever 57 having its upper end pivoted on the extension 53A of cradle 53. The cradle 53 is pivoted at its forward end in the side walls of casing 12, it being noted that the forwardly disposed rod 53B of cradle 53 has ends of reduced diameter extending into a corresponding apertured portion of the side wall of casing 12 for that purpose.

The grill 21 lies on the cradle 53 and comprises a series of parallel rods 21A joined together as a unit at their ends to rods 21B, 21C. The rods 21B, 21C are spaced so as to include the cradle rods 53B, 53C therebetween; and to further assure retention of the grill 21 on its cradle 53, the cradle rod 53C has welded thereto a short rod 53D that overlies the grill rod 21B and serves as a hook.

Using this structure, it is thus seen that the grill 21 may be adjusted so that its plane is horizontal or tilted forwardly and downwardly in varying degrees to allow greases to gravitate downwardly and forwardly from where such greases may then drip into the drip pan 25 without entering the fire bowl.

It is apparent that the grill 21 may be quickly removed from its rectangular supporting cradle 53. This is usually done when food is cooked on the motor driven spit instead of on the grill.

The spit motor 70 with suitable reduction gear is mounted on the right side wall of the casing 12 within housing 16 so that the driving shaft 71 extends inside the casing. The shaft 71 is in the form of a square socket to releasably retain one end of the square shaft 72, the other end of shaft 72 being rounded and journalled for rotation in an oversized apertured portion 12B in casing 12. A pair of conventional prongs 75, 76 is releasably secured on the square rod 72 by wing nuts 77 (FIG. 3).

The rod 72 may be conveniently placed in position and removed by lifting and moving one end thereof through the slightly oversized opening 12B so as to bring the other end into or out of engagement with the square socket in shaft 71 and moving the assembly through the upper front door of the unit.

Figure 8:
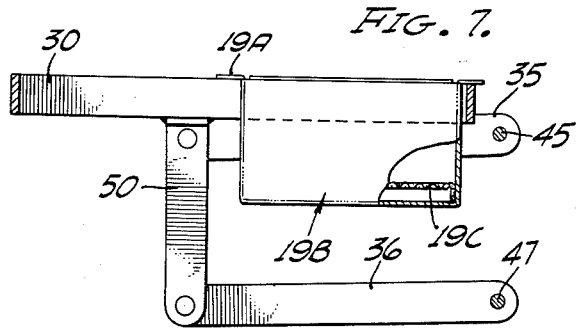
FIGURE 8 is a view similar to FIGURE 7 but illustrates a smaller fire box disposed in the adjustable cradle.
Figure 9:
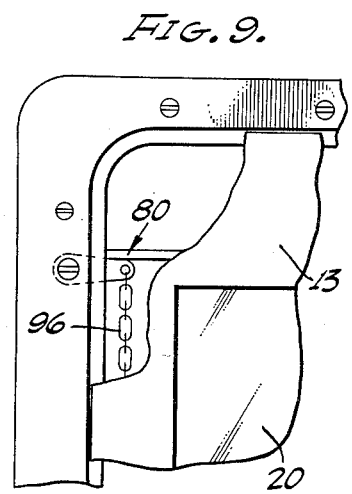
FIGURE 9 illustrates further details of the door construction illustrated in FIGURE 1.

When using the motor driven spit a less intense heat is usually required and in such case a smaller fire box 19B positioned as shown in FIG. 8 is used to allow drippings to fall into the drip pan 25 without entering the fire box. It is noted that the fire boxes 19 and 19B are removable, are essentially shallow metal flanged pans with a raised metal screen 19C, of, for example, expanded metal, in the bottom thereof to allow ashes to fall therethrough and to improve combustion.

The upper portion of the unit 12 also provides a warming oven and for that purpose a food supporting shelf 80 is releasably mounted on a pair of rods 81, 82 extending through the front end and rear walls of the casing 12.

The upper end of casing 12 is vented to the flue 15 which has a conventional metal dust and grease filter element 85 releasably secured therein by spring clips 86.

An exhaust fan 87 is placed in the flue 15 to generally increase the draft and expel odors to the outside of the building structure. Such fan 87 serves also to cool the spit motor 70 by inducing a stream of cooling air past the same. For this latter purpose the front face of the motor housing 16 is provided with a louvered plate 16A so that air may be drawn in through the louvres, past the motor and into the conduit 18, and flue 15 from where it is expelled by the fan 87. This plate 16A is removable to allow access to the motor 70 for servicing and repair purposes, the plate 16A being normally retained on the stationary portion of housing 16 by metal fastening screws and having extending therethrough the manually operated switch element for the electric motor 70.

The door 13 is hinged at its lower end on hinges 90 and 91 and a magnetic latch 93 serves to maintain the door closed. A conventional thermometer 94 is mounted on the upper portion of door 13 to register the temperature near the warming oven. A chain 96 having one of its ends attached to the door 13 and the other one of its ends attached to the casing 12 limits opening of the door to a position wherein its plane extends substantially horizontally.

Figure 5:
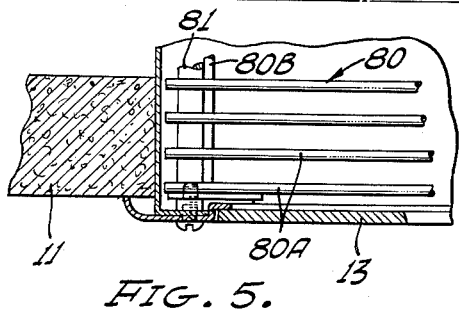
FIGURE 5 is a sectional view taken on the line 5—5 of FIGURE 1.
Figure 6:
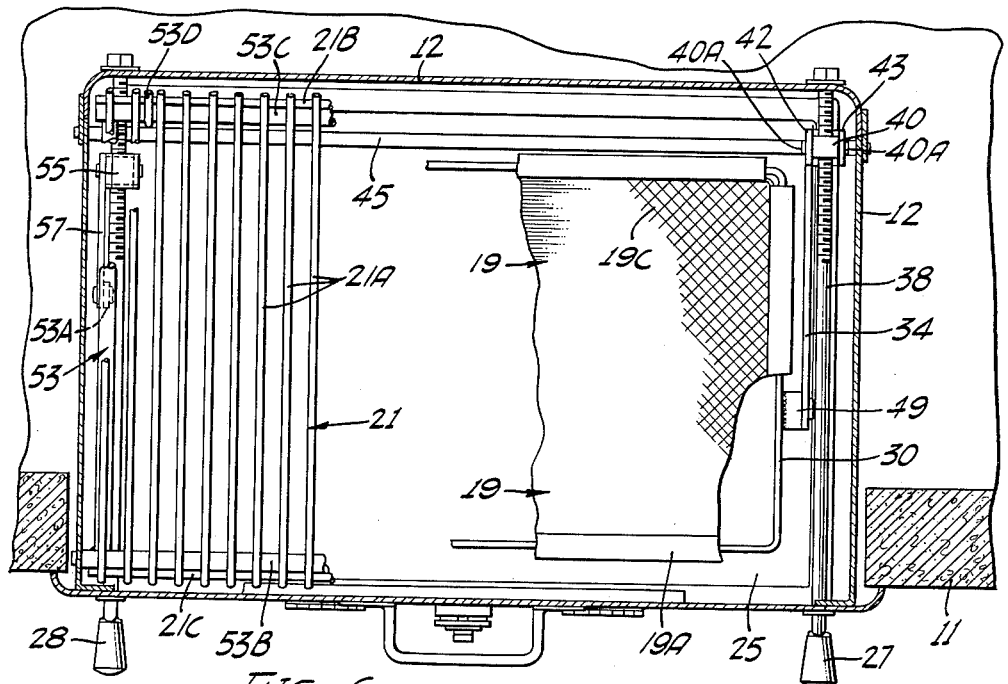
FIGURE 6 is a sectional view taken on the line 6—6 of FIGURE 4.
Figure 7:
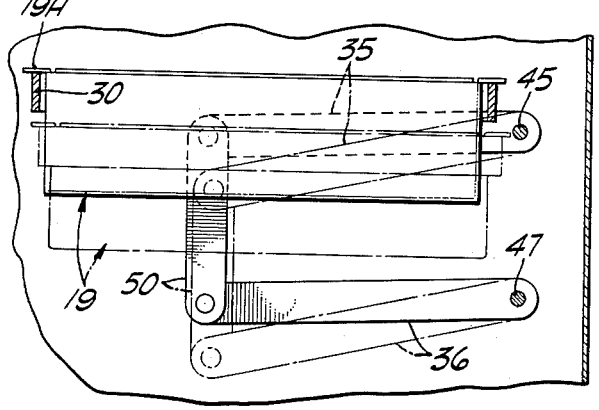
FIGURE 7 illustrates in more detail features of the adjustable fire box cradle.

In use of the arrangement, the drip pan 25 may be pulled out slightly to control the draft. It is noted that the warming over shelf 80 allows the flow of heat since it is of conventional construction involving a series of spaced parallel rods 80A interconnected at their ends by like rods 80B, as shown in FIG. 5.

It is noted also that the slanting grill not only provides a means for directing the flow of drippings into the drip pan but, further, it provides a means whereby the user may position food further away from or closer to the coals in the fire box, as desired.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. Barbecue equipment comprising, in combination, a generally rectangular casing for mounting in a recess of a building structure, a flue extending upwardly from the top of said casing, a generally planar grill tiltably mounted in said casing, a fire box under said grill and in said casing, means on said casing for adjusting the tilt of said grill, means for adjusting the spacing between said fire box and said grill without altering the tilt of the grill established by the last mentioned means, and a drip pan normally closing said casing but slidably mounted in said casing below said fire box for controlling the draft through said casing and flue and past the fire box.

2. Barbecue equipment as set forth in claim 1 including an open shelf defining a warming oven above said grill.

3. Barbecue equipment comprising, in combination, a casing for mounting in the recess of a building structure, a door forming a wall of said casing, a grill carriage pivotally mounted adjacent said door, means for pivoting said grill carriage from a generally horizontal position to a position inclined downwardly and towards said door, an open grill releasably secured on said carriage, a fire box carriage under said grill, parallelogram means for adjusting the height of said fire box carriage, a fire box releasably secured on said fire box carriage, and a motor driven spit above said grill carriage.

4. Barbecue equipment comprising, in combination, a barbecue casing for mounting in the recess of a building structure and having an inlet and an outlet, a flue in communication with the outlet of said casing for conducting vapors, odors and gases out of said casing, fan means in said flue for inducing a flow of air through said casing and said flue, a spit motor mounted outside of said casing, a spit shaft driven by said motor and extending into said casing and a separate conduit extending from said motor to said fan means for inducing a flow of cooling air past said spit motor.

References Cited in the file of this patent

UNITED STATES PATENTS

| | | |
|---|---|---|
| 1,010,169 | Noreck | Nov. 28, 1911 |
| 2,114,698 | Babin | Apr. 19, 1938 |
| 2,180,459 | Earle | Nov. 21, 1939 |
| 2,180,868 | Dunning et al. | Nov. 21, 1939 |
| 2,309,784 | Peron | Feb. 2, 1943 |
| 2,626,559 | Rau | Jan. 27, 1953 |
| 2,720,827 | Del Francia | Oct. 18, 1955 |
| 2,734,499 | Lombardi | Feb. 14, 1956 |
| 2,763,200 | Kittler | Sept. 18, 1956 |
| 2,838,991 | Kleinmann et al. | June 17, 1958 |
| 2,881,695 | Di Pietro | Apr. 14, 1959 |

FOREIGN PATENTS

| | | |
|---|---|---|
| 75,616 | Germany | Oct. 1, 1893 |
| 14,030 | Great Britain | Nov. 16, 1895 |